US012803658B2

(12) United States Patent
Lee et al.

(10) Patent No.: US 12,803,658 B2
(45) Date of Patent: Nov. 17, 2026

(54) MECHANISM FOR MULTI-INTERVAL DISCONTINUOUS RECEPTION

(71) Applicant: Nokia Technologies Oy, Espoo (FI)

(72) Inventors: Gilsoo Lee, Naperville, TX (US); Mads Lauridsen, Aalborg (DK); Ping Yuan, Beijing (CN); Rapeepat Ratasuk, Naperville, IL (US); Srinivasan Selvaganapathy, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 19/233,344

(22) Filed: Jun. 10, 2025

(65) Prior Publication Data

US 2025/0300723 A1 Sep. 25, 2025

Related U.S. Application Data

(63) Continuation of application No. 18/729,108, filed as application No. PCT/CN2022/072520 on Jan. 18, 2022.

(51) Int. Cl.
*H04B 7/185* (2006.01)
*H04W 52/02* (2009.01)

(52) U.S. Cl.
CPC .... *H04B 7/18513* (2013.01); *H04W 52/0229* (2013.01); *H04W 52/0251* (2013.01)

(58) Field of Classification Search
CPC .......... H04B 7/18513; H04W 52/0229; H04W 52/0251; H04W 64/00; Y02D 30/70
See application file for complete search history.

(56) References Cited

U.S. PATENT DOCUMENTS

| | | | | |
|---|---|---|---|---|
| 9,699,754 B1 | 7/2017 | Mauer et al. | | |
| 2008/0318596 A1* | 12/2008 | Tenny | H04W 64/00 455/456.2 | |

(Continued)

FOREIGN PATENT DOCUMENTS

| | | | |
|---|---|---|---|
| CN | 104429152 A | 3/2015 | |
| CN | 108700669 A | 10/2018 | |

(Continued)

OTHER PUBLICATIONS

Extended European Search Report received for corresponding European Patent Application No. 22921035.6, dated Aug. 28, 2025, 10 pages.

(Continued)

*Primary Examiner* — Fred A Casca
(74) *Attorney, Agent, or Firm* — Nokia Technologies Oy

(57) ABSTRACT

Embodiments of the present disclosure propose a solution for multi-interval DRX. According to embodiments of the present disclosure, a DRX method is introduced to use multiple intervals synchronized with the satellites' coverage timing. The DRX according to embodiments of the present disclosure allows the terminal device to wake up according to a set of pre-determined intervals determined by the network. The network determines the wake-up intervals based on the information on the satellite orbits (ephemeris) and the UE device information. In this way, the energy at the terminal device has been saved, thereby maximizing the battery life of the terminal device. Moreover, it also avoids the terminal device from unnecessary activation.

11 Claims, 6 Drawing Sheets

(56) References Cited

U.S. PATENT DOCUMENTS

| | | | | |
|---|---|---|---|---|
| 2014/0254451 | A1 | 9/2014 | Jamadagni et al. | |
| 2015/0282076 | A1 | 10/2015 | Larmo et al. | |
| 2017/0006424 | A1* | 1/2017 | Liin | H04W 4/021 |
| 2018/0041965 | A1 | 2/2018 | Korneluk et al. | |
| 2019/0058522 | A1 | 2/2019 | Haley et al. | |
| 2020/0029302 | A1 | 1/2020 | Cox et al. | |
| 2021/0243724 | A1 | 8/2021 | Starsinic et al. | |
| 2022/0360977 | A1 | 11/2022 | Kim et al. | |
| 2022/0369222 | A1* | 11/2022 | Wu | H04W 24/10 |
| 2023/0121104 | A1* | 4/2023 | Wu | G01S 19/51 455/456.6 |
| 2023/0396368 | A1 | 12/2023 | Zhang et al. | |
| 2024/0015659 | A1* | 1/2024 | Zhou | H04B 7/18513 |
| 2024/0163754 | A1* | 5/2024 | Hong | H04W 36/08 |

FOREIGN PATENT DOCUMENTS

| | | | |
|---|---|---|---|
| CN | 112399548 | A | 2/2021 |
| CN | 112929953 | A | 6/2021 |
| CN | 113225791 | A | 8/2021 |
| CN | 113676234 | A | 11/2021 |
| WO | 2020/064531 | A1 | 4/2020 |
| WO | 2020/248153 | A1 | 12/2020 |
| WO | 2021/154848 | A1 | 8/2021 |
| WO | 2021/219283 | A1 | 11/2021 |

OTHER PUBLICATIONS

"Discussion on support of Non continuous coverage", 3GPP TSG-RAN WG2 Meeting #116-e, R2-2110262, Agenda item: 9.2.2, CMCC, Nov. 1-12, 2021, 5 pages.

"On Discontinuous coverage in IoT-NTN", 3GPP TSG-RAN WG2 Meeting #116-e, R2-2110922, Agenda Item: 9.2.2, MediaTek Inc., Nov. 1-12, 2021, 3 pages.

"Discontinuous coverage in IoT NTN", 3GPP TSG-RAN WG2 Meeting #116bis-e, R2-2201599, Agenda Item: 9.2.2, Ericsson, Jan. 17-25, 2022, 7 pages.

"Consideration on the control plane of IoT over NTN", 3GPP TSG-RAN WG2 Meeting #113 (e-meeting), R2-2100338, Agenda Item: 9.2.3, ZTE Corporation, Jan. 25-Feb. 5, 2021, 7 pages.

Office action received for corresponding Chinese Patent Application No. 202280093696.X, dated Sep. 6, 2025, 9 pages of office action and 8 pages of translation available.

"3rd Generation Partnership Project; Technical Specification Group Radio Access Network; NR; Physical layer procedures for control (Release 16)", 3GPP TS 38.213, V16.6.0, Jun. 2021, pp. 1-187.

"3rd Generation Partnership Project; Technical Specification Group Radio Access Network; NR; Radio Resource Control (RRC) protocol specification (Release 16)", 3GPP TS 38.331, V16.5.0, Jun. 2021, pp. 1-959.

"3rd Generation Partnership Project; Technical Specification Group Radio Access Network; Evolved Universal Terrestrial Radio Access (E-UTRA); Medium Access Control (MAC) protocol specification (Release 16)", 3GPP TS 36.321, V16.5.0, Jun. 2021, pp. 1-143.

"3rd Generation Partnership Project; Technical Specification Group Radio Access Network; Evolved Universal Terrestrial Radio Access (E-UTRA); User Equipment (UE) procedures in idle mode (Release 16)", 3GPP TS 36.304, V16.4.0, Jun. 2021, pp. 1-64.

"3rd Generation Partnership Project; Technical Specification Group Radio Access Network; Solutions for NR to support non-terrestrial networks (NTN) (Release 16)", 3GPP TR 38.821, V16.1.0, May 2021, pp. 1-140.

"3rd Generation Partnership Project; Technical Specification Group Radio Access Network; Study on Narrow-Band Internet of Things (NB-IoT) / enhanced Machine Type Communication (eMTC) support for Non-Terrestrial Networks (NTN) (Release 17)", 3GPP TR 36.763, V17.0.0, Jun. 2021, pp. 1-73.

"3rd Generation Partnership Project; Technical Specification Group GSM/EDGE Radio Access Network; Cellular system support for ultra-low complexity and low throughput Internet of Things (CIoT) (Release 13)", 3GPP TR 45.820, V13.1.0, Nov. 2015, pp. 1-495.

Liu et al., "Discontinuous Reception for Multiple-Beam Communicationl", IEEE Access, vol. 07, Apr. 9, 2019, pp. 46931-46946.

"Other aspects to support IoT in NTN", 3GPP TSG RAN WG1 Meeting #104-e, R1-2101261, Agenda: 8.15.5, Huawei, Jan. 25-Feb. 5, 2021, 4 pages.

"Discussion on additional enhancements for IoT-NTN", 3GPP TSG RAN WG1 #104b-e, R1-2102920, Agenda: 8.15.5, ZTE, Apr. 12-20, 2021, pp. 1-4.

"IEEE 802.11", Wikipedia, Retrieved on Jul. 30, 2025, Webpage available at : https://en.wikipedia.org/wiki/IEEE_802.11.

International Search Report and Written Opinion received for corresponding Patent Cooperation Treaty Application No. PCT/CN2022/072520, dated Sep. 29, 2022, 10 pages.

Office action received for corresponding Canada Patent Application No. 3249061, dated Jul. 16, 2025, 4 pages.

Office action received for corresponding Canada Patent Application No. 3249061, dated Feb. 17, 2026, 3 pages.

Non-Final Office action received for corresponding U.S. Appl. No. 18/729,108, dated May 12, 2026, 27 pages.

Office action received for corresponding Chinese Patent Application No. 202280093696.X, dated Mar. 11, 2026, 7 pages of office action and 8 pages of translation available.

Office action received for corresponding Indian Patent Application No. 202447062319, dated Jul. 10, 2026, 8 pages.

* cited by examiner

MECHANISM FOR MULTI-INTERVAL DISCONTINUOUS RECEPTION

RELATED APPLICATIONS

The present application is a 37 C.F.R. § 1.53(b) continuation of co-pending U.S. patent application Ser. No. 18/729,108, filed on Jul. 15, 2024, which is a National Stage of PCT Application No. PCT/CN2022/072520, filed on Jan. 18, 2022, which is incorporated herein by reference in its entirety.

FIELD

Embodiments of the present disclosure generally relate to the field of telecommunication and in particular, to methods, devices, apparatuses and computer readable storage medium for multi-interval discontinuous reception (DRX).

BACKGROUND

The third generation partnership project (3GPP) has supported technologies of new radio (NR) on non-terrestrial networks (NTN). There are several types of satellites, for example, Low Earth Orbiting (LEO), Geostationary Earth Orbiting (GEO) and Medium Earth Orbiting (MEO). For LEO, the satellite is moving with high speed. Due to the LEO satellite motion, a terminal device can be located outside of satellite coverage. Earth-moving cells follow the satellite coverage while moving with the speed of satellite 7500 m/s. Therefore, the satellite coverage highly depends on satellite constellation and network provider's satellite deployment, thus yielding a discontinuous coverage in NTN scenarios.

SUMMARY

In general, example embodiments of the present disclosure provide a solution for multi-interval discontinuous reception (DRX).

In a first aspect, there is provided a first device. The first device comprises at least one processor; and at least one memory including computer program codes; the at least one memory and the computer program codes are configured to, with the at least one processor, cause the first device to: receive, from a second device, first information indicating at least one wake-up interval which is determined based on location information of the first device and orbit information of at least one non-terrestrial network device; and determine to attempt to detect the at least one non-terrestrial network device according to the at least one wake-up interval.

In a second aspect, there is provided a second device. The second device comprises at least one processor; and at least one memory including computer program codes; the at least one memory and the computer program codes are configured to, with the at least one processor, cause the second device to: determine, at the second device, at least one wake-up interval based on location information of a first device and orbit information of at least one non-terrestrial network device; and transmitting, to the first device, first information indicating the at least one wake-up interval.

In a third aspect, there is provided a method. The method comprises receiving, from the second device, first information indicating at least one wake-up interval which is determined based on location information of the first device and orbit information of at least one non-terrestrial network device; and determining to attempt to detect the at least one non-terrestrial network device according to the at least one wake-up interval.

In a fourth aspect, there is provided a method. The method comprises determining, at a second device, at least one wake-up interval based on location information of a first device and orbit information of at least one non-terrestrial network device; and transmitting, to the first device, first information indicating the at least one wake-up interval.

In a fifth aspect, there is provided an apparatus. The apparatus comprise means for performing the method according to any one of the above second aspect.

In a sixth aspect, there is provided an apparatus. The apparatus comprises means for performing the method according to any one of the above fourth aspect.

In a seventh aspect, there is provided a computer readable medium. The computer readable medium comprises program instructions for causing an apparatus to perform at least the method according to any one of the third or fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
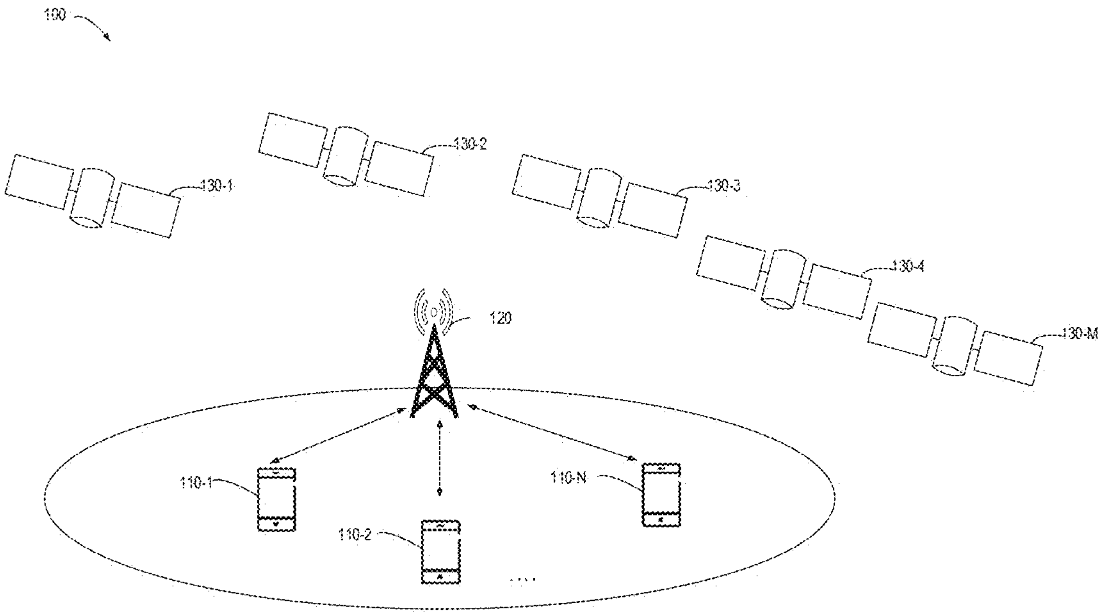
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure.

Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, an Integrated and Access Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. The term "terminal device" refers to any end device that may be capable of wireless communication. In the following description, the terms "terminal device", "terminal", "user equipment" and "UE" may be used interchangeably.

As mentioned above, there may be a discontinuous coverage in NTN scenarios. When internet of thing (IoT) UE is deployed on NTN, the UE device consumes power for channel monitoring. Since IoT UE has small size of battery and is expected to have a long battery duration, the power consumption should be reduced. An example of IoT power consumption for battery life evaluation methodology is shown in Table 1.

TABLE 1

| | |
|---|---|
| Battery power during Tx (mW) | 543 |
| Battery power for Rx (mW) | 90 |
| Battery power when Idle but not in PSS (mW) | 2.4 |
| Battery power in Power Save State (PSS) (mW) | 0.015 |

In Table 1, if IoT UE is monitoring the downlink channel, the battery power consumption is 90 mW. Table 1 also shows that if the IoT UE device is in power saving status (PSS), the power consumption of 0.015 mW is significantly lower than the power consumed in other states. Therefore, by using the low battery power consumption in PSS, the power saving techniques have been adopted for IoT UE. For example, DRX or eDRX (extended DRX) is a periodic sleeping and wake-up mode enabling UE to conserve energy and extend battery life.

During the power saving period, UE can lose the satellite coverage, due to satellite and/or UE movement. In the silent period without traffic, UE does not monitor the satellite coverage, and the existence of the satellite coverage is unknown to the UE. When UE is waking up to transmit a data, it may determine it is located outside of the satellite coverage. In the case of discontinuous coverage, the usage of one periodic timer for DRX does not guarantee UE to observe the satellite when the timer wakes up the UE. Due to the UE mobility, sporadic transmission of IoT traffic, satellite constellation design and earth rotation, the inter-arrival timing of the satellite coverage is not described as a single periodic timer. Also, if UE wake up without coverage of satellite, the UE will be out-of-synchronization. The out-of-synchronization UE should perform the initial cell access procedure, thus consuming extra energy.

Therefore, a solution for multi-interval DRX is proposed. According to embodiments of the present disclosure, a DRX method is introduced to use multiple intervals synchronized with the satellites' coverage timing. The DRX according to embodiments of the present disclosure allows the terminal device to wake up according to a set of pre-determined intervals determined by the network. The network determines the wake-up intervals based on the information on the satellite orbits (ephemeris) and the UE device information. In this way, the energy at the terminal device has been saved, thereby maximizing the battery life of the terminal device. Moreover, it also avoids the terminal device from unnecessary activation. In case of mobile-originated traffic, the UE may also use satellite coverage information from the multi-interval DRX configuration to make sure that it only tries to access the network during satellite coverage (e.g. to delay initial access until UE is in satellite coverage as indicated by the multi-interval DRX configuration).

FIG. 1 illustrates a schematic diagram of a communication environment 100 in which embodiments of the present disclosure can be implemented. The communication environment 100, which is a part of a communication network, further comprises a device 110-1, a device 110-2, . . . , a device 110-N, which can be collectively referred to as "first device(s) 110." The communication environment 100 comprises a second device 120. In some example embodiments, the second device 120 can be a terrestrial network device. In some example embodiments, the second device can be a non-terrestrial network device. The communication environment 100 also comprises a non-terrestrial network device 130-1, a non-terrestrial network device 130-2, a non-terrestrial network device 130-3, a non-terrestrial network device 130-4, . . . , a non-terrestrial network device 130-M, which can be collectively referred to as "non-terrestrial device(s) 130." N and M can be any suitable integers. The non-terrestrial network device 130 can be a satellite. It should be noted that the non-terrestrial network device 130 can be any proper device.

The communication environment 100 may comprise any suitable number of devices and cells. In the communication environment 100, the first device 110 and the second device 120 can communicate data and control information to each other. In the case that the first device 110 is the terminal device and the second device 120 is the network device, a link from the second device 120 to the first device 110 is referred to as a downlink (DL), while a link from the first device 110 to the second device 120 is referred to as an uplink (UL). In some example embodiments, the regenerative architecture can be applied to the communication environment 100. Alternatively, a bent-pipe architecture can be applied to the communication environment 100.

It is to be understood that the number of first devices and cells and their connections shown in FIG. 1 is given for the purpose of illustration without suggesting any limitations. The communication environment 100 may include any suitable number of devices and networks adapted for implementing embodiments of the present disclosure.

Communications in the communication environment 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 2:
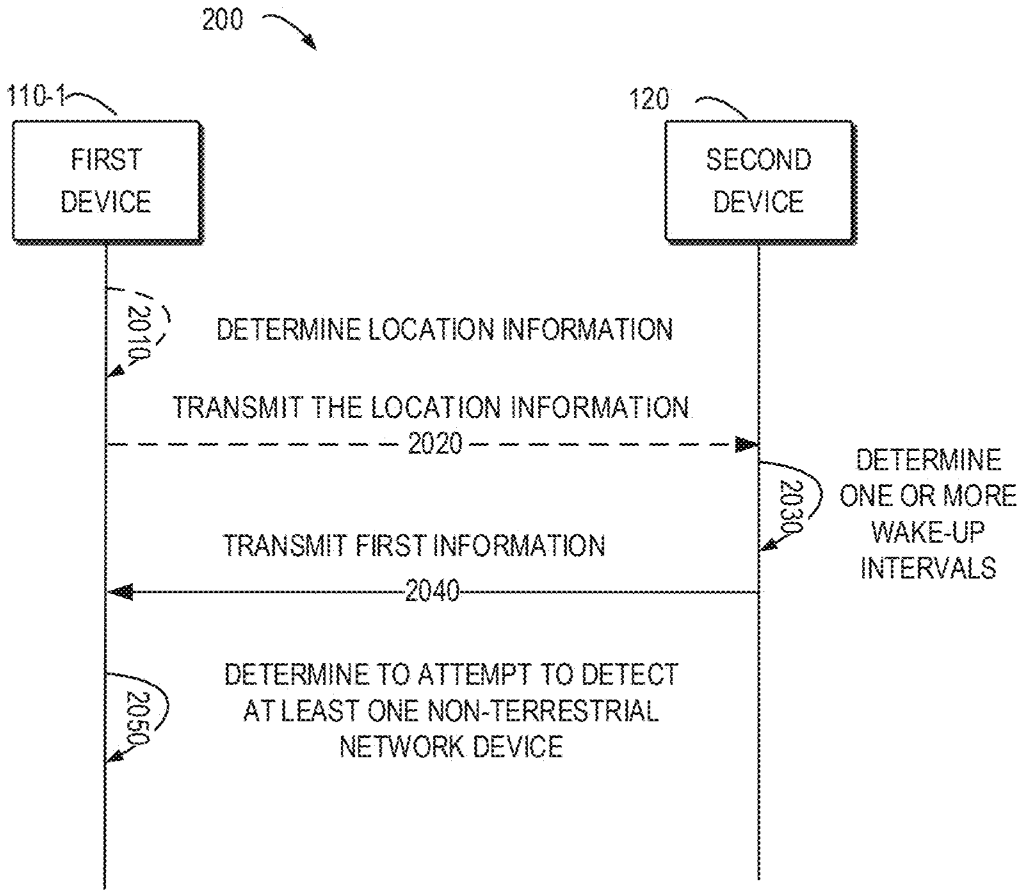
FIG. 2 illustrates a signaling flow for multi-interval DRX according to some example embodiments of the present disclosure.

Reference is now made to FIG. 2, which illustrates a signaling flow 200 for multi-interval DRX according to example embodiments of the present disclosure. For the purpose of discussion, the signaling flow 200 will be described with reference to FIG. 1. Only for the purpose of illustrations, the signaling flow 200 may involve the first device 110-1 and the second device 120.

In some example embodiments, the first device 110-1 may determine 2010 location information of the first device 110-1. In some example embodiments, the first device 110-1 may determine one or more current locations of the first device 110-1. Alternatively or in addition, the first device 110-1 may determine one or more projected/estimated locations of the first device 110-1. For example, the first device 110-1 may estimate the one or more projected locations based on the one or more current locations and/or other information. Only as an example, if the first device 110-1 is moving, the one or more projected locations may be estimated based on the one or more current locations and the moving speed of the first device 110-1. In some example embodiments, the first device 110-1 may determine a silent period of the first device 110-1 where no data is received or transmitted. For instance, the silent period of the first device 110-1 can be determined based on the sporadic or periodic IoT traffic pattern. Alternatively, if the first device 110-1 does not have enough battery, a long silent period can be set for energy saving.

Alternatively, the second device 120 may estimate/determine the location information of the first device 110-1. In this case, the second device 120 may transmit the location information to the first device 110-1. The location may comprise one or more current locations of the first device 110-1. In this case, the second device 120 may determine one or more current locations of the first device 110-1. Alternatively or in addition, the location information may comprise one or more projected/estimated locations of the first device 110-1. In this case, the second device 120 may determine one or more projected/estimated locations of the first device 110-1. For example, the second device 120 may estimate the one or more projected locations based on the one or more current locations and/or other information. Only as an example, if the first device 110-1 is moving, the one or more projected locations may be estimated based on the one or more current locations and the moving speed of the first device 110-1.

In some example embodiments, the location information may comprise a UE type of the first device 110-1. For example, the location information can comprise a traffic type of the first device 110-1. The location information may also comprise an application type of the first device 110-1. In some example embodiments, the location information may comprise a battery status of the first device 110-1. For example, the battery status may indicate the energy level at the first device 110-1. Alternatively or in addition, the location information may indicate a mobility of the first device 110-1. For example, the location information may indicate whether the first device 110-1 is moving. In addition, the location information may also indicate a trajectory or a route plan of the first device 110-1. As mentioned above, the first device 110-1 may determine a silent period of the first device 110-1 where no data is received or transmitted. In this case, the location information may indicate the silent period of the first device 110-1. In some example embodiments, the first device 110-1 may transmit 2020 the location information to the second device 120.

In some example embodiments, if the first device 110-1 receives the location information from the second device 120, the first device 110-1 may determine whether the location information is valid based on global navigation satellite system (GNSS) information of the first device. The first device 110-1 may determine whether the first information is applicable based on the validity of the location information. The term "GNSS" used herein can refer to all satellite navigation systems, for example Global Positioning System (GPS), Galileo and the like. In other words, the first device 110-1 may receive the location information from the second device 120, when the second device 120 has estimated the UE location. In this case, after the second device 120 estimates the location of the first device 110-1, the first device 110-1 can use its own GNSS information to validate whether the estimation of the location of the first device 110-1 is acceptable. The first device 110-1 can subsequently determine whether the current configuration of wake-up intervals is still applicable.

The second device 120 determines 2030 one or more wake-up intervals based on the location information of the first device 110-1 and orbit information of the non-terrestrial network device 130. For example, the orbit information can comprise estimation of the radio coverage on earth from each cell/satellite according to the satellite movement in the orbit. In this way, the wake-up intervals can be customized for each UE's circumstances.

The wake-up interval is a duration where there is radio coverage from a second device in the area including the first device's location. The wake-up interval can be also called in other terminology such as a coverage interval, availability duration, and availability period that indicate a time period where the first device is within a second device's coverage or within a non-terrestrial network device. The set of wake-up intervals can comprise any proper number of wake-up intervals. For example, the set of wake-up intervals may only comprise one wake-up interval. Alternatively, the set of wake-up intervals may comprise more than one wake-up interval.

In some example embodiments, by using the location information of the first device 110-1, the second device can determine the one or more wake-up intervals so that the first device 110-1 is able to wake up in a cell coverage of a non-terrestrial network device. Alternatively or in addition, the second device 120 may take a traffic density level of the first device 110-1 into consideration when determining the one or more wake-up intervals. In this case, the second device 120 can increase the gap between two wake-up timing instances if the location information indicates a delay-tolerant and sporadic data transmission of the first device 110-1.

Moreover, the battery-level information can be considered to determine the set of wake-up intervals. If the location information indicates that the first device 110-1 does not have enough battery, the gap between two wake-up timing instances can be extended for energy saving. Additionally, if the location information indicates the UE-specific silent period, the second device 120 can determine each wake-up interval period longer than the UE-specific silent period so that first device 110-1 is not being paged in the silent period.

Figure 3:
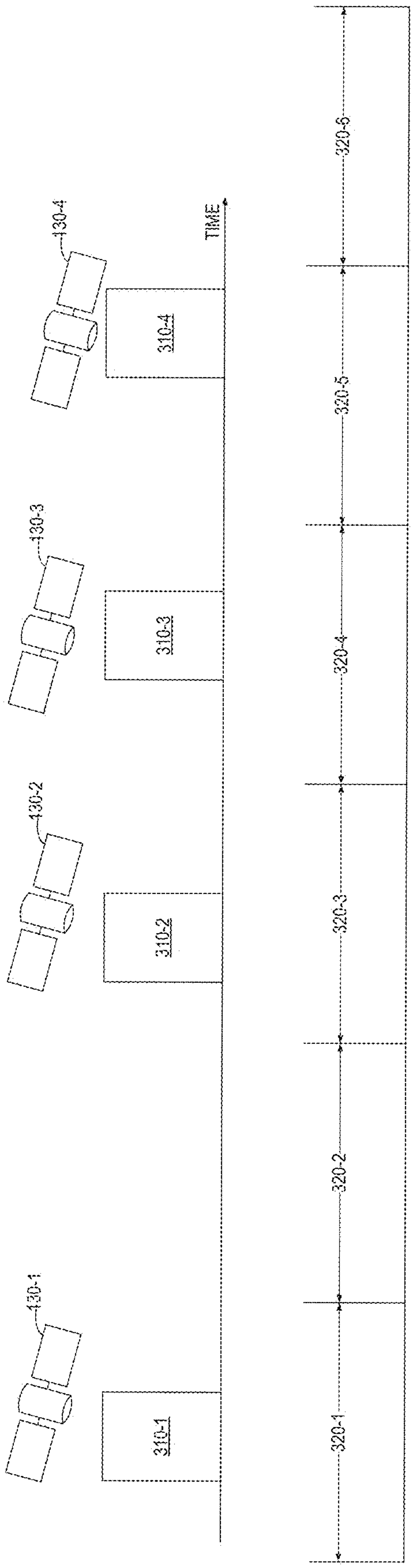
FIG. 3 illustrates a schematic diagram of a multi-interval DRX according to some example embodiments of the present disclosure.

The second device 120 transmits 2040 first information to the first device 110-1. The first information indicates the set of wake-up intervals. Reference is made to FIG. 3. The first information may indicate the wake-up intervals 310-1, 310-2, 310-3 and 310-4. In some example embodiments, the second device 120 may indicate one or more expected physical cell identities (PCIs) of cells available in the set of wake-up intervals. For example, the first information may indicate PCI of an estimated final cell of each available non-terrestrial network device.

In some example embodiments, the first information may comprise a time information e.g., time series information, or the like which is used for indicating the set of wake-up intervals. In other words, the set of wake-up intervals can be directly represented as a time series. For example, the wake-up intervals can be indicated by a format of year-month-day-hour-minute-second (YMDhms). Only as an example, the wake-up intervals 310-1, 310-2, 310-3 and 310-4 can be indicated as 20YY-MM-DD-HH1-XX1-ZZ1, 20YY-MM-DD-HH2-XX2-ZZ2, 20YY-MM-DD-HH3-XX3-ZZ3, and 20YY-MM-DD-HH4-XX4-ZZ4. Also, the beginning and end of wake-up intervals can be indicated by using the timestamp in the same format of YMDhms. Alternatively, or in addition, the wake-up intervals can be indicated by the number of system frame number (SFN) or the number of hyper SFN.

Alternatively, the first information may comprise a set of values which is used for indicating the set of wake-up intervals. In this case, the second device may determine a set of pre-configured values indexed as A, B, and C having different time periods TA, TB, and TC. The set of wake-up intervals may be translated into a combination of pre-configured values. In one example, the second device 120 may determine four wake-up time instants where the gap periods between each pair of adjacent wake-up intervals are TC, TA, and TB, respectively. In that case, the second device 120 can inform the first device 110-1 of the order of the pre-configured periods 'C-A-B' so that the first device 110-1 can interpret 'C-A-B' as the wake-up timing with three intervals TC, TA, and TB. In other words, if the first information can indicate 'C-A-B', the first device 110-1 can interpret 'C-A-B' as the wake-up timing with three periods TC, TA, and TB.

In some other embodiments, the first information may comprise a mask for a DRX configuration. In this case, the first device 110-1 may determine the set of wake-up intervals based on the mask and the DRX configuration. Alternatively, the first information may comprise a mask for a power saving mode (PSM) configuration. In this case, the first device 110-1 may determine the set of wake-up intervals based on the mask and the PSM configuration. For example, an on/off mask may be applied by modifying conventional eDRX and power saving mode (PSM). For example, when the first device 110-1 is using the conventional eDRX operation, if there is coverage, the mask should indicate ON, and the first device 110-1 may use the eDRX pattern for the specific cell. When there is no coverage, the mask should indicate OFF and the first device 110-1 will be sleeping (or in PSM). Thus, the second device 120 only needs to define the ON/OFF mask, for example, the length of each sequence of on-off, while each cell is free to signal its own eDRX configuration. Alternatively, the mask can be defined in a way such that it applies to multiple satellites' coverage instances, so the first device 110-1 does not need to get updated settings at every coverage instance. For example, as shown in FIG. 3, since the wake-up intervals comprise the wake-up intervals 310-1, 310-2, 310-3 and 310-4, the mask may indicate ON for the DRX cycles 320-1, 320-3, 320-4 and 320-5 and indicate OFF for the DRX cycles 320-2 and 320-6. In this way, it can reduce signaling and therefore energy consumption. Moreover, it is more applicable as the periodicity of the satellites' coverage becomes consistent.

Embodiments of the present disclosure can also be applied to the feature PSM. For instance, to implement the on/off mask method, the network can configure multiple T3324 and T3412 so that the first device stays in idle and PSM modes.

In some example embodiments, the second device 120 may transmit second information to the first device 110-1. The second information can indicate a time offset from a hyper frame number (HFN) of a current page time window (PTW) to a next HFN which falls within the coverage window. In this way, the time offset from a hyper frame number of a current page time window to a next hyper frame number.

Alternatively or in addition, the second device 120 may transmit third information to the first device 110-1. In some example embodiments, the third information may indicate a type of the non-terrestrial network device. For example, the third information may indicate that the non-terrestrial network device can be a MEO or LEO. Alternatively, the third information may indicate an initial arrival direction of the non-terrestrial network device. For example, the third information may comprise azimuth and elevation angles of the non-terrestrial network device with respect to the first device 110-1. In some other embodiments, the third information may comprise an ephemeris of the non-terrestrial network device. The term "ephemeris" used herein can refer to (1) position and movement vector or (2) orbital information. For example, ephemeris may define the satellite's position at the specific interval where the first device 110-1 is expected to be covered by the satellite and PCI/other synchronization information. In this way, the first device can achieve UE pre-compensation of timing drift and Doppler shift error based on the third information.

Referring back to FIG. 2, the first device 110-1 determines 2050 to attempt to detect the at least one non-terrestrial network device according to the one or more wake-up intervals. In other words, the first device may actually detect the at least one non-terrestrial network or may try to but not actually detect the at least one non-terrestrial network. For example, the first device 110-1 may use the scheduled wake-up intervals to wake up when the first cell appears. The first device 110-1 may keep monitoring for paging until the final cell becomes unavailable. In this case, the PCI of the final cell can be provided as part of the first information.

In some example embodiments, when the first device 110-1 observes the PCI of the final cell of the current satellite, PSM can be triggered. For example, after the non-terrestrial network device 130-1 with the last PCI A disappears, the first device 110-1 can stay in sleep mode until a next non-terrestrial network device 130-2 appears. When the non-terrestrial network device 130-2 with the last PCI B disappears, the first device 110-1 can enter PSM. In this case, the first information may comprise a list of cells such as the neighboring cells of PCIB. The first device 110-1 may monitor for paging for the full cell availability period. As a result, the monitored availability period can be used as the triggering condition for starting each of the PSM intervals. Alternatively, the coverage (i.e. coverage availability) intervals can also be estimated and provided in the first information.

For each operation at each access timing, the first device 110-1 can wake up and check whether the first device 110-1 is located in a coverage of the non-terrestrial network device. In some example embodiments, the first device 110-1 may perform a measurement during the set of wake-up intervals and select a cell based on the measurement. For example, as a default case, when the first device 110-1 was in the idle mode, the first device 110-1 may perform a measurement and select the new cell. The first device 110-1 may be in the idle mode unless it is paged or has UL data. In cell search procedure, if the first device 110-1 detects a terrestrial cell, the terrestrial network (TN) can be prioritized over NTN. In this case, the first device 110-1 can be connected to the TN and terminate the current (NTN-specific) DRX operation.

In some example embodiments, if a number of failure attempts satisfies or exceeds a threshold number, the first device 110-1 may initiate to establish a network connection another device (for example, the second device 120 or a device different from the second device 120). In this case, in some embodiments, the threshold number for failure attempts may be indicated in the first information. For example, if the first device 110-1 fails to access to the non-terrestrial network device during one of the non-terrestrial network device, the first device 110-1 may increase a value of a failure counter. In this case, if the value of the failure counter exceeds a threshold number, the first device 110-1 may initiate to establish a network connection to the second device 120. The threshold number may be indicated in the first information. Alternatively, the threshold number may be configured at the first device 110-1. For example, the first device 110-1 may stay in the connected mode, for example, if the sleep period is short. In this case, the first device 110-1 may observe downlink signal, for example, physical downlink control channel (PDCCH). If the first device 110-1 detects a satellite's signal, the first device 110-1 may attempt to decode the PDCCH. If the first device 110-1 does not observe the PDCCH or cannot decode the PDCCH, the first device 110-1 may consider that the event is counted as link failure, thus increasing the failure counter by one. The accumulated number of failures exceeding a threshold can eventually require the first device 110-1 to reselect a cell. The failure probability may depend on UE mobility and/or estimation error. In this case, the first device 110-1 needs to acquire new information of new satellite by reselecting a cell.

Figure 4:
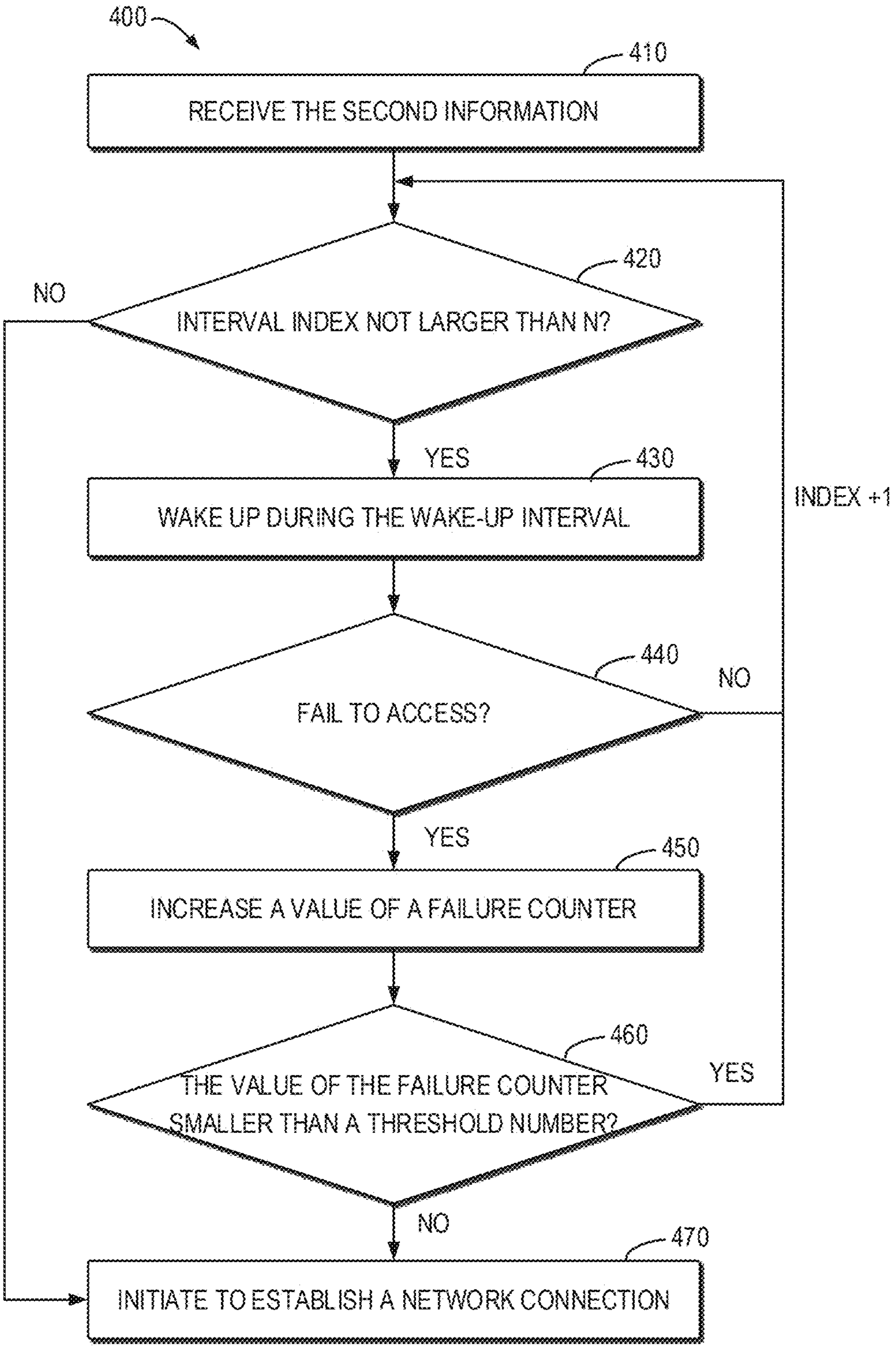
FIG. 4 illustrates a flowchart of a method implemented at a first device according to some example embodiments of the present disclosure.

Reference is made to FIG. 4. At block 410, the first device 110-1 can receive the first information from the second device 120. After receiving the first information, the first device 110-1 may start to wake up based on the first information. At block 420, the first device 110-1 may determine whether the current interval index is not larger than the largest interval index. If the current interval index is larger than the largest interval index, at block 470, the first device 110-1 may initiate to establish a network connection with the second device 120. If the current interval index is not larger than the largest interval index, at block 430, the first device 110-1 may wake up according to or during the current wake-up interval. At block 440, the first device 110-1 may determine whether the first device 110-1 fails to access to the non-terrestrial network device during the wake-up interval. If the first device 110-1 successfully accesses to the non-terrestrial network device during the wake-up interval, the first device 110-1 may increase the index of the wake-up interval by one and wake up based on the first information. At block 450, if the first device 110-1 fails to access to the non-terrestrial network device during the wake-up interval, the first device 110-1 may increase a value of a failure counter by one. At block 460, the first device 110-1 may determine whether the value of the failure counter is smaller than a threshold number. In some example embodiments, the threshold number may be transmitted in the first information. Alternatively, the threshold number may be configured at the first device 110-1. If the value of the failure counter is not smaller than the threshold number, at block 470, the first device 110-1 may initiate to establish the network connection with the second device 120. If the value of the failure counter is smaller than the threshold number, the first device 110-1 may increase the index of the wake-up interval by one and wake up based on the first information.

Embodiments of the present disclosure can be applicable to IoT UE when IoT UE must access NTN coverage (terrestrial network coverage is not provided). According to embodiments of the present disclosure, a new energy saving technique essential for IoT-type UE is introduced to extend/maximize the battery life, which enables UE to avoid unnecessary activation (wake-up). Embodiments of the present disclosure also address a solution of a IoT NTN issue where a single periodic timer of DRX is not readily decided.

Figure 5:
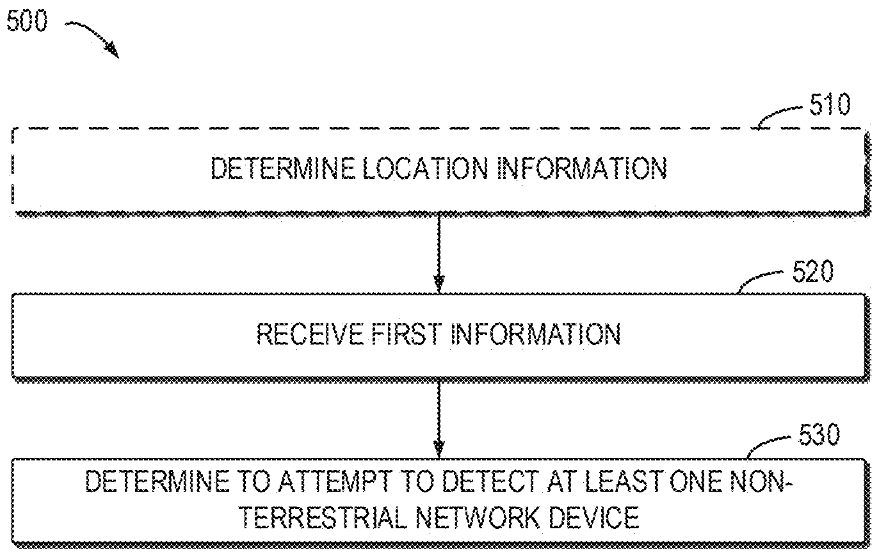
FIG. 5 illustrates a flowchart of a method implemented at a first device according to some example embodiments of the present disclosure.

FIG. 5 shows a flowchart of an example method 500 in accordance with some example embodiments of the present disclosure. For the purpose of discussion, the method 500 will be described from the perspective of the first device 110-1.

In some example embodiments, at block 510, the first device 110-1 may determine location information of the first device 110-1. In some example embodiments, the first device 110-1 may determine one or more current locations of the first device 110-1. Alternatively or in addition, the first device 110-1 may determine one or more projected locations of the first device 110-1. For example, the first device 110-1 may estimate the one or more projected locations based on the one or more current locations and/or other information. Only as an example, if the first device 110-1 is moving, the one or more projected locations may be estimated based on the one or more current locations and the moving speed of the first device 110-1. In some example embodiments, the first device 110-1 may determine a silent period of the first device 110-1 where no data is received or transmitted. For instance, the silent period of the first device 110-1 can be determined based on the sporadic or periodic IoT traffic pattern. Alternatively, if the first device 110-1 does not have enough battery, a long silent period can be set for energy saving. Alternatively, the first device 110-1 may receive the location information from the second device 120.

In some example embodiments, the location information may comprise a UE type of the first device 110-1. For example, the location information can comprise a traffic type of the first device 110-1. The location information may also comprise an application type of the first device 110-1. In some example embodiments, the location information may comprise a battery status of the first device 110-1. For example, the battery status may indicate the energy level at the first device 110-1. Alternatively or in addition, the location information may also indicate a mobility of the first device 110-1. For example, the location information may indicate whether the first device 110-1 is moving. In addition, the location information may also indicate a trajectory or a route plan of the first device 110-1. As mentioned above, the first device 110-1 may determine a silent period of the first device 110-1 where no data is received or transmitted. In this case, the location information may indicate the silent period of the first device 110-1. In some example embodiments, the first device 110-1 may transmit the location information to the second device 120. Alternatively, the first device 110-1 may receive the location information of the first device 110-1 from the second device 120.

At block 520, the first device 110-1 receives first information from the second device 120. The first information indicates at least one wake-up interval. In some example embodiments, the second device 120 may indicate one or more expected physical cell identities (PCIs) of cells available in the set of wake-up intervals. For example, the first information may indicate PCI of an estimated final cell of each non-terrestrial network device. The wake-up interval is a duration where there is radio coverage from a second device in the area including the first device's location. The wake-up interval can be also called in other terminology such as a coverage interval, availability duration, and availability period that indicate a time period where the first device is within a second device's coverage or within a non-terrestrial network device. A set of wake-up intervals can comprise any proper number of wake-up intervals. For example, the set of wake-up intervals may only comprise one wake-up interval. Alternatively, the set of wake-up intervals may comprise more than one wake-up interval.

In some example embodiments, the first information may comprise time information which is used for indicating the set of wake-up intervals. In other words, the set of wake-up intervals can be directly represented as a time series. For example, the wake-up intervals can be indicated by a format of year-month-day-hour-minute-second (YMDhms). Also, the beginning and end of wake-up intervals can be indicated by using the timestamp in the same format of YMDhms. Alternatively, or in addition, the wake-up intervals can be indicated by the number of system frame number (SFN) or the number of hyper SFN.

Alternatively, the first information may comprise a set of values which is used for indicating the set of wake-up intervals. In this case, the second device may determine a set of pre-configured values indexed as A, B, and C having different time periods TA, TB, and TC. The set of wake-up intervals may be translated into a combination of pre-configured values. In one example, if the second device 120 determines four wake-up time instants where the gap periods between each pair of adjacent wake-up intervals are TC, TA, and TB, respectively. In that case, the second device 120 can informs the first device 110-1 of the order of the pre-configured periods 'C-A-B' so that the first device 110-1 can interpret 'C-A-B' as the wake-up timing with three intervals TC, TA, and TB. In other words, if the first information can indicate 'C-A-B', the first device 110-1 can interpret 'C-A-B' as the wake-up timing with three periods TC, TA, and TB.

In some other embodiments, the first information may comprise a mask for a DRX configuration. In this case, the first device 110-1 may determine the set of wake-up intervals based on the mask and the DRX configuration. Alternatively, the first information may comprise a mask for a power saving mode (PSM) configuration. In this case, the first device 110-1 may determine the set of wake-up intervals based on the mask and the PSM configuration. For example, an on/off mask may be applied by modifying conventional eDRX and power saving mode (PSM). For example, when the first device 110-1 is using the conventional eDRX operation, if there is coverage, the mask should indicate ON, and the first device 110-1 may use the eDRX pattern for the specific cell. When there is no coverage, the mask should indicate OFF and the first device 110-1 will be sleeping (or in PSM). Thus, the second device 120 only needs to define the ON/OFF mask, for example, the length of each sequence of on-off, while each cell is free to signal its own eDRX configuration. Alternatively, the mask can be defined in a way such that it applies to multiple satellites' coverage instances, so the first device 110-1 does not need to get updated settings at every coverage instance. In this way, it can reduce signaling and therefore energy consumption. Moreover, it is more applicable as the periodicity of the satellites' coverage becomes consistent.

Embodiments of the present disclosure can also be applied to the feature PSM. For instance, to implement the on/off mask method, the network can configure multiple T3324 and T3412 so that the first device stays in idle and PSM modes.

In some example embodiments, the first device 110-1 may receive second information from the second device 120. The second information can indicate a time offset from a hyper frame number (HFN) of a current page time window (PTW) to a next HFN which falls within the coverage window. In this way, the time offset from a hyper frame number of a current page time window to a next hyper frame number.

Alternatively or in addition, the first device 110-1 may receive third information from the second device 120. In some example embodiments, the third information may indicate a type of the non-terrestrial network device. For example, the third information may indicate that the non-terrestrial network device can be a MEO or LEO. Alternatively, the third information may indicate an initial arrival direction of the non-terrestrial network device. For example, the third information may comprise azimuth and elevation angles of the non-terrestrial network device with respect to the first device 110-1. In some other embodiments, the third information may comprise an ephemeris of the non-terrestrial network device. The term "ephemeris" used herein can refer to (1) position and movement vector or (2) orbital information. For example, ephemeris may define the satellite's position at the specific interval where the first device 110-1 is expected to be covered by the satellite and PCI/other synchronization information. In this way, the first device can achieve UE pre-compensation of timing drift and Doppler shift error based on the third information.

At block 530, the first device 110-1 determines to attempt to detect the at least one non-terrestrial network device according to the one or more wake-up intervals. In other words, the first device may actually detect the at least one non-terrestrial network or may try to but not actually detect the at least one non-terrestrial network. For example, the first device 110-1 may use the scheduled wake-up intervals to wake up when the first cell appears. The first device 110-1 may keep monitoring for paging until the final cell becomes unavailable. In this case, the PCI of the final cell can be provided as part of the first information.

In some example embodiments, when the first device 110-1 observes the PCI of the final cell of the current satellite, PSM can be triggered. For example, after the non-terrestrial network device 130-1 with the last PCI A disappears, the first device 110-1 can stay in sleep mode until a next non-terrestrial network device 130-2 appears. When the non-terrestrial network device 130-2 with the last PCI B disappears, the first device 110-1 can enter PSM. In this case, the first information may comprise a list of cells such as the neighboring cells of PCIB. The first device 110-1 may monitor for paging for the full cell availability period. As a result, the monitored availability period can be used as the triggering condition for starting each of the PSM intervals. Alternatively, the ON (i.e. coverage availability) intervals can also be estimated and provided in the first information.

For each operation at each access timing, the first device 110-1 can wake up and check whether the first device 110-1 is located in a coverage of the non-terrestrial network device. In some example embodiments, the first device 110-1 may perform a measurement during the set of wake-up intervals and select a cell based on the measurement. For example, as a default case, when the first device 110-1 was in the idle mode, the first device 110-1 may perform a measurement and select the new cell. The first device 110-1 may be in the idle mode unless it is paged or has UL data. In cell search procedure, if the first device 110-1 detects a terrestrial cell, the terrestrial network (TN) can be prioritized over NTN. In this case, the first device 110-1 can be connected to the TN and terminate the current (NTN-specific) DRX operation.

In some example embodiments, if a number of failure attempts satisfies or exceeds a threshold number, the first device 110-1 may initiate to establish a network connection to the second device. For example, if the first device 110-1 fails to access to the non-terrestrial network device during one of the non-terrestrial network device, the first device 110-1 may increase a value of a failure counter. In this case, if the value of the failure counter exceeds a threshold number, the first device 110-1 may initiate to establish a network connection to the second device 120. The threshold number may be indicated in the first information. Alternatively, the threshold number may be configured at the first device 110-1. For example, the first device 110-1 may stay in the connected mode, for example, if the sleep period is short. In this case, the first device 110-1 may observe downlink signal, for example, physical downlink control channel (PDCCH). If the first device 110-1 detects a satellite's signal, the first device 110-1 may attempt to decode the PDCCH. If the first device 110-1 does not observe the PDCCH or cannot decode the PDCCH, the first device 110-1 may consider that the event is counted as link failure, thus increasing the failure counter by one. The accumulated number of failures exceeding a threshold can eventually require the first device 110-1 to reselect a cell. The failure probability may depend on UE mobility and/or estimation error. In this case, the first device 110-1 needs to acquire new information of new satellite by reselecting a cell.

Figure 6:
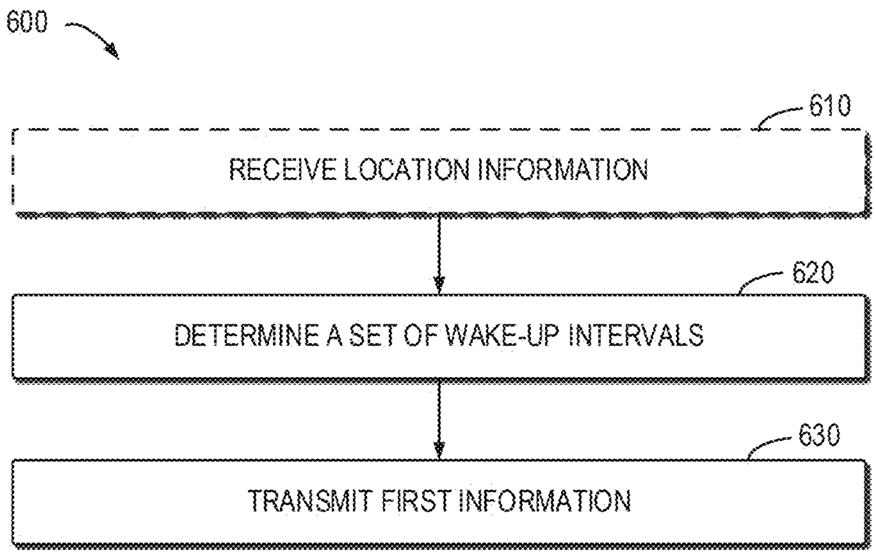
FIG. 6 illustrates a flowchart of a method implemented at a first device according to some example embodiments of the present disclosure.

FIG. 6 shows a flowchart of an example method 600 in accordance with some example embodiments of the present disclosure. For the purpose of discussion, the method 600 will be described from the perspective of the second device 120.

In some example embodiments, at block 610, the second device 120 may receive location information from the first device 110-1. Alternatively, the second device 120 may determine location information of the first device 110-1. The location may comprise one or more current locations of the first device 110-1. The second device 120 may transmit the location information to the first device 110-1. In this case, the second device 120 may determine one or more current locations of the first device 110-1. Alternatively or in addition, the location information may comprise one or more projected/estimated locations of the first device 110-1. In this case, the second device 120 may determine one or more projected/estimated locations of the first device 110-1. For example, the second device 120 may estimate the one or more projected locations based on the one or more current locations and/or other information. Only as an example, if the first device 110-1 is moving, the one or more projected locations may be estimated based on the one or more current locations and the moving speed of the first device 110-1. In some example embodiments, the location information may comprise a UE type of the first device 110-1. For example, the location information can comprise a traffic type of the first device 110-1. The location information may also comprise an application type of the first device 110-1. In some example embodiments, the location information may comprise a battery status of the first device 110-1. For example, the battery status may indicate the energy level at the first device 110-1. Alternatively or in addition, the location information may also indicate a mobility of the first device 110-1. For example, the location information may indicate whether the first device 110-1 is moving in a relatively high speed. As mentioned above, the first device 110-1 may determine a silent period of the first device 110-1 where no data is received or transmitted. In this case, the location information may indicate the silent period of the first device 110-1.

At block 620, the second device 120 determines one or more wake-up intervals based on the location information of the first device 110-1 and orbit information of the non-terrestrial network device 130. In this way, the wake-up intervals can be customized for each UE's circumstances. For example, the orbit information can comprise estimation of the radio coverage on earth from each cell/satellite according to the satellite movement in the orbit. In this way, the wake-up intervals can be customized for each UE's circumstances.

The wake-up interval is a duration where there is radio coverage from a second device in the area including the first device's location. The wake-up interval can be also called in other terminology such as a coverage interval, availability duration, and availability period that indicate a time period where the first device is within a second device's coverage or within a non-terrestrial network device.

In some example embodiments, by using the location information of the first device 110-1, the second device can determine the one or more wake-up intervals so that the first device 110-1 is able to wake up in a cell coverage of a non-terrestrial network device. Alternatively or in addition, the second device 120 may take a traffic density level of the first device 110-1 into consideration when determining the one or more wake-up intervals. In this case, the second device 120 can increase the gap between two wake-up timing instances if the location information indicates a delay-tolerant and sporadic data transmission of the first device 110-1.

Moreover, the battery-level information can be considered to determine the set of wake-up intervals. If the location information indicates that the first device 110-1 does not have enough battery, the gap between two wake-up timing instances can be extended for energy saving. Additionally, if the location information indicates the UE-specific silent period, the second device 120 can determine each wake-up interval period longer than the UE-specific silent period so that first device 110-1 is not being paged in the silent period.

At block 630, the second device 120 transmits first information to the first device 110-1. The first information indicates the set of wake-up intervals. In some example embodiments, the second device 120 may indicate one or more expected physical cell identities (PCIs) of cells available in the set of wake-up intervals. For example, the first information may indicate PCI of an estimated final cell of each non-terrestrial network device.

In some example embodiments, the first information may comprise time information which is used for indicating the set of wake-up intervals. In other words, the set of wake-up intervals can be directly represented as a time series. For example, the wake-up intervals can be indicated by a format of year-month-day-hour-minute-second (YMDhms). Also, the beginning and end of wake-up intervals can be indicated by using the timestamp in the same format of YMDhms. Alternatively, or in addition, the wake-up intervals can be indicated by the number of system frame number (SFN) or the number of hyper SFN.

Alternatively, the first information may comprise a set of values which is used for indicating the set of wake-up intervals. In this case, the second device may determine a set of pre-configured values indexed as A, B, and C having different time periods TA, TB, and TC.

The set of wake-up intervals may be translated into a combination of pre-configured values. In one example, the second device 120 may determine four wake-up time instants where the gap periods between each pair of adjacent wake-up intervals are TC, TA, and TB, respectively. In that case, the second device 120 can informs the first device 110-1 of the order of the pre-configured periods 'C-A-B' so that the first device 110-1 can interpret 'C-A-B' as the wake-up timing with three intervals TC, TA, and TB. In other words, if the first information can indicate 'C-A-B', the first device 110-1 can interpret 'C-A-B' as the wake-up timing with three periods TC, TA, and TB.

In some other embodiments, the first information may comprise a mask for a DRX configuration. In this case, the first device 110-1 may determine the set of wake-up intervals based on the mask and the DRX configuration. Alternatively, the first information may comprise a mask for a power saving mode (PSM) configuration. In this case, the first device 110-1 may determine the set of wake-up intervals based on the mask and the PSM configuration. For example, an on/off mask may be applied by modifying conventional eDRX and power saving mode (PSM). For example, when the first device 110-1 is using the conventional eDRX operation, if there is coverage, the mask should indicate ON, and the first device 110-1 may use the eDRX pattern for the specific cell. When there is no coverage, the mask should indicate OFF and the first device 110-1 will be sleeping (or in PSM). Thus, the second device 120 only needs to define the ON/OFF mask, for example, the length of each sequence of on-off, while each cell is free to signal its own eDRX configuration. Alternatively, the mask can be defined in a way such that it applies to multiple satellites' coverage instances, so the first device 110-1 does not need to get updated settings at every coverage instance. Moreover, it is more applicable as the periodicity of the satellites' coverage becomes consistent.

Embodiments of the present disclosure can also be applied to the feature PSM. For instance, to implement the on/off mask method, the network can configure multiple T3324 and T3412 so that the first device stays in idle and PSM modes.

In some example embodiments, the second device 120 may transmit second information to the first device 110-1. The second information can indicate a time offset from a hyper frame number (HFN) of a current page time window (PTW) to a next HFN which falls within the coverage window. In this way, the time offset from a hyper frame number of a current page time window to a next hyper frame number.

Alternatively or in addition, the second device 120 may transmit third information to the first device 110-1. In some example embodiments, the third information may indicate a type of the non-terrestrial network device. For example, the third information may indicate that the non-terrestrial network device can be a MEO or LEO. Alternatively, the third information may indicate an initial arrival direction of the non-terrestrial network device. For example, the third information may comprise azimuth and elevation angles of the non-terrestrial network device with respect to the first device 110-1. In some other embodiments, the third information may comprise an orbital ephemeris of the non-terrestrial network device. For example, ephemeris may define the satellite's position at the specific interval where the first device 110-1 is expected to be covered by the satellite and PCI/other synchronization information. In this way, the first device can achieve UE pre-compensation of timing drift and Doppler shift error based on the third information.

In some example embodiments, an apparatus capable of performing any of the methods 400 and 500 (for example, the first device 110) may comprise means for performing the respective operations of the methods 400 and 500. The means may be implemented in any suitable form. For example, the means may be implemented in a circuitry or software module. The apparatus may be implemented as or included in the first device 110. In some example embodiments, the means may comprise at least one processor and at least one memory including computer program code. The at least one memory and computer program code are configured to, with the at least one processor, cause performance of the apparatus.

In some example embodiments, the apparatus comprises means for receiving, from the second device, first information indicating at least one wake-up interval which is determined based on location information of the first device and orbit information of at least one non-terrestrial network device; and means for determining to attempt to detect the at least one non-terrestrial network device according to the at least one wake-up interval.

In some example embodiments, the apparatus further comprises means for transmitting the location information to the second device.

In some example embodiments, the location information further indicates at least one of: a traffic type of the first device, an application type of the first device, a battery status of the first device, or a silent period of the first device where the monitoring is not performed.

In some example embodiments, the apparatus further comprises means for determining at least one of: a set of current locations of the first device and a set of projected locations of the first device, and wherein the location information comprises at least one of: the set of current locations of the first device and the set of projected locations of the first device.

In some example embodiments, the means for receiving the first information comprises: means for receiving the first information comprising time information indicating the at least one wake-up interval.

In some example embodiments, the means for receiving the first information comprises: receiving the first information comprising a set of values; and the apparatus further comprises means for determining the at least one wake-up interval based on the set of values.

In some example embodiments, the means for receiving the first information comprises: means for receiving the first information comprising a mask for a discontinuous reception (DRX) configuration or a Power Saving Mode (PSM) configuration; and the apparatus further comprises means for determining the at least one wake-up interval based on the mask and the DRX configuration or based on the mask and the PSM configuration.

In some example embodiments, the apparatus further comprises means for receiving from the second device second information indicating a time offset from a hyper frame number of a current page time window to a next hyper frame number.

In some example embodiments, the apparatus further comprises means for receiving from the second device third information indicating: a type of the at least one non-terrestrial network device, an initial arrival direction of the at least one non-terrestrial network device, or an ephemeris of the at least one non-terrestrial network device.

In some example embodiments, the apparatus further comprises means for performing a measurement during the at least one wake-up interval; and selecting a cell based on the measurement.

In some example embodiments, the apparatus further comprises means for in accordance with a determination that a number of failure attempts exceeds a threshold number, initiating to establish a network connection to another device.

In some example embodiments, the first information indicates the threshold number.

In some example embodiments, the first device comprises a terminal device and the second device comprises a network device.

In some example embodiments, an apparatus capable of performing any of the method 600 (for example, the second device 120) may comprise means for performing the respective operations of the method 600. The means may be implemented in any suitable form. For example, the means may be implemented in a circuitry or software module. The apparatus may be implemented as or included in the second device 120. In some example embodiments, the means may comprise at least one processor and at least one memory including computer program code. The at least one memory and computer program code are configured to, with the at least one processor, cause performance of the apparatus.

In some example embodiments, the apparatus comprises means for determining, at a second device, at least one wake-up interval based on location information of a first device and orbit information of at least one non-terrestrial network device; and means for transmitting, to the first device, first information indicating the at least one wake-up interval.

In some example embodiments, the apparatus further comprises means for receiving location information indicating the location information of the first device from the first device; or means for determining the location information at the second device.

In some example embodiments, the location information further indicates at least one of: a traffic type of the first device, an application type of the first device, a battery status of the first device, or a silent period of the first device where the monitoring is not performed.

In some example embodiments, the location information comprises at least one of: the set of current locations of the first device and the set of projected locations of the first device.

In some example embodiments, the means for transmitting the first information comprises: means for transmitting the first information comprising time information indicating the at least one wake-up interval.

In some example embodiments, the means for transmitting the first information comprises: means for transmitting the first information comprising a set of values for indicating the at least one wake-up interval.

In some example embodiments, the means for transmitting the first information comprises: means for transmitting the first information comprising a mask for a discontinuous reception (DRX) configuration or a Power Saving Mode (PSM) configuration. In some example embodiments, the apparatus further comprises means for transmitting to the first device second information indicating a time offset from a hyper frame number of a current page time window to a next hyper frame number.

In some example embodiments, the apparatus further comprises means for transmitting to the first device third information indicating at least one of: a type of the at least one non-terrestrial network device, an initial arrival direction of the at least one non-terrestrial network device, or an ephemeris of the at least one non-terrestrial network device.

In some example embodiments, the first information indicates a threshold number for failure attempts at the first device.

In some example embodiments, the apparatus further comprises means for receiving the location information from the second device.

In some example embodiments, the apparatus further comprises means for determining whether the location information is valid based on global navigation satellite system (GNSS) information of the first device; and determining whether the first information is applicable based on the validity of the location information.

In some example embodiments, the first device comprises a terminal device and the second device comprises a network device.

Figure 7:
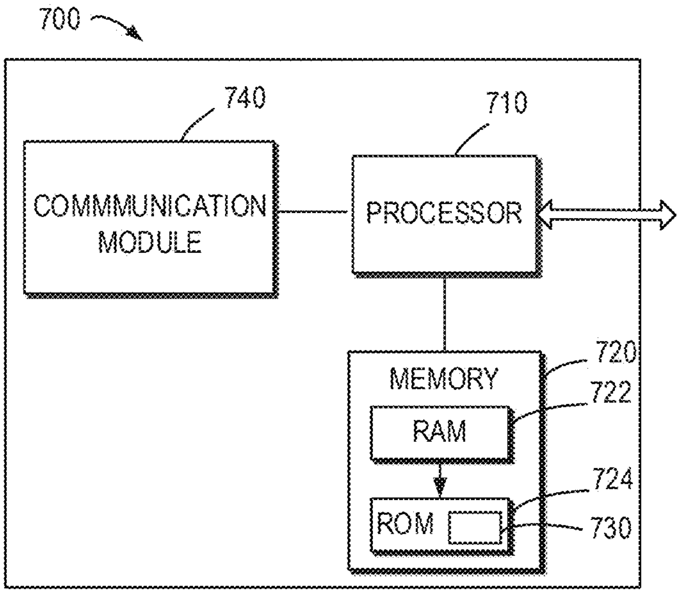
FIG. 7 illustrates a simplified block diagram of an apparatus that is suitable for implementing example embodiments of the present disclosure.

FIG. 7 is a simplified block diagram of a device 700 that is suitable for implementing example embodiments of the present disclosure. The device 700 may be provided to implement a communication device, for example, the first device 110 or the second device 120 as shown in FIG. 1. As shown, the device 700 includes one or more processors 710, one or more memories 720 coupled to the processor 710, and one or more communication modules 740 coupled to the processor 710.

The communication module 740 is for bidirectional communications. The communication module 740 has one or more communication interfaces to facilitate communication with one or more other modules or devices. The communication interfaces may represent any interface that is necessary for communication with other network elements. In some example embodiments, the communication module 740 may include at least one antenna.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the memory, e.g., ROM 724. The processor 710 may perform any suitable actions and processing by loading the program 730 into the RAM 722.

Example embodiments of the present disclosure may be implemented by means of the program 730 so that the device 700 may perform any process of the disclosure as discussed with reference to FIGS. 2 to 6. The example embodiments of the present disclosure may also be implemented by hardware or by a combination of software and hardware.

Figure 8:
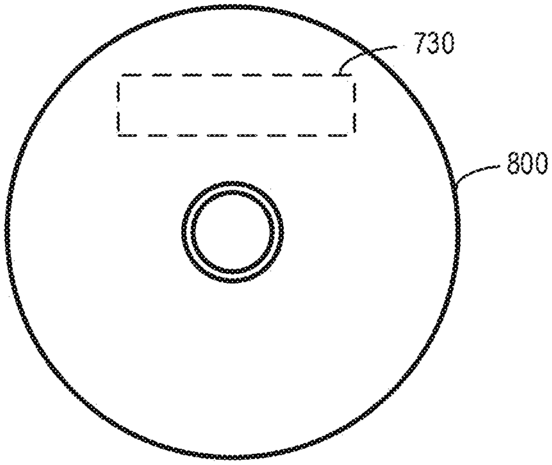
FIG. 8 illustrates a block diagram of an example computer readable medium in accordance with some example embodiments of the present disclosure.

In some example embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and other magnetic storage and/or optical storage. FIG. 8 shows an example of the computer readable medium 700 in form of an optical storage disk. The computer readable medium has the program 730 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target physical or virtual processor, to carry out any of the methods as described above with reference to FIGS. 2 to 6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device, comprising:

at least one processor; and at least one memory including computer program code;

wherein the at least one memory and the computer program code are configured to, with the at least one processor, cause the first device to:

determine location information comprising at least one of: a set of current locations of the first device and a set of projected locations of the first device;

receive, from a second device, first information indicating at least one wake-up interval which is determined based on the location information of the first device and orbit information of at least one non-terrestrial network device;

determine to attempt to detect the at least one non-terrestrial network device according to the at least one wake-up interval;

receive the first information comprising a mask for a discontinuous reception (DRX) configuration or a Power Saving Mode (PSM) configuration, wherein the at least one wake-up interval is determined based on the mask and the DRX configuration or based on the mask and the PSM configuration; and transmit the location information of the first device to the second device.

2. The first device of claim 1, wherein the location information further indicates at least one of:

a traffic type of the first device, an application type of the first device, a battery status of the first device, or a silent period of the first device where the monitoring is not performed.

3. The first device of claim 1, wherein the at least one memory and the computer program codes are configured to, with the at least one processor, further cause the first device to:

receive from the second device third information:

a type of the at least one non-terrestrial network device, an initial arrival direction of the at least one non-terrestrial network device, or an ephemeris of the at least one non-terrestrial network device.

4. The first device of claim 1, wherein the at least one memory and the computer program codes are configured to, with the at least one processor, further cause the first device to:

perform a measurement during the at least one wake-up interval; and select a cell based on the measurement.

5. The first device of claim 1, wherein the at least one memory and the computer program codes are configured to, with the at least one processor, further cause the first device to:

receive the location information from the second device.

6. The first device of claim 1, wherein the first device comprises a terminal device and the second device comprises a network device.

7. A second device, comprising:

at least one processor; and at least one memory including computer program code;

wherein the at least one memory and the computer program code are configured to, with the at least one processor, cause the second device to:

determine, at the second device, at least one wake-up interval based on location information of a first device and orbit information of at least one non-terrestrial network device, the location information comprising at least one of: a set of current locations of the first device and a set of projected locations of the first device; and transmit, to the first device, first information indicating the at least one wake-up interval, wherein the first information comprises a mask for a discontinuous reception (DRX) configuration or a Power Saving Mode (PSM) configuration for determining the at least one wake-up interval based on the mask and the DRX configuration or based on the mask and the PSM configuration.

8. The second device of claim 7, wherein the at least one memory and the computer program codes are configured to, with the at least one processor, further cause the second device to:

receive the location information of the first device from the first device.

9. The second device of claim 7, wherein the first device comprises a terminal device and the second device comprises a network device.

10. A method, comprising:

determining location information comprising at least one of: a set of current locations of the first device and a set of projected locations of the first device;

receiving, at a first device and from a second device, first information indicating at least one wake-up interval which is determined based on the location information of the first device and orbit information of at least one non-terrestrial network device; and determining to attempt to detect the at least one non-terrestrial network device according to the at least one wake-up interval, wherein the first information comprises a mask for a discontinuous reception (DRX) configuration or a Power Saving Mode (PSM) configuration, and the method further comprises determining the at least one wake-up interval based on the mask and the DRX configuration or based on the mask and the PSM configuration.

11. A method, comprising:

determining, at a second device, at least one wake-up interval based on location information of a first device and orbit information of at least one non-terrestrial network device, the location information comprising at least one of: a set of current locations of the first device and a set of projected locations of the first device; and transmitting, to the first device, first information indicating the at least one wake-up interval, wherein the first information comprises a mask for a discontinuous reception (DRX) configuration or a Power Saving Mode (PSM) configuration for determining the at least one wake-up interval based on the mask and the DRX configuration or based on the mask and the PSM configuration.

* * * * *